(12) United States Patent
Zeiner et al.

(10) Patent No.: US 7,992,363 B2
(45) Date of Patent: Aug. 9, 2011

(54) METHOD AND APPARATUS FOR PALLETIZING CONFECTIONED UNITS OF ARTICLES

(75) Inventors: Peter Zeiner, Raubling (DE); Kurt Perl, Rimsting (DE)

(73) Assignee: Krones AG, Neutraubling (DE)

( * ) Notice: Subject to any disclaimer, the term of this patent is extended or adjusted under 35 U.S.C. 154(b) by 88 days.

(21) Appl. No.: 12/427,267

(22) Filed: Apr. 21, 2009

(65) Prior Publication Data

US 2009/0260494 A1 Oct. 22, 2009

(30) Foreign Application Priority Data

Apr. 22, 2008 (DE) .......................... 10 2008 020 301

(51) Int. Cl.
*B65B 35/50* (2006.01)
(52) U.S. Cl. ........... 53/157; 53/447; 53/540; 414/789.5; 414/796.2
(58) Field of Classification Search .................... 53/157, 53/447, 540, 541, 535, 537, 443; 414/793, 414/796.9, 796.2, 789.5
See application file for complete search history.

(56) References Cited

U.S. PATENT DOCUMENTS

| | | | |
|---|---|---|---|
| 3,897,877 A * | 8/1975 | Vandermeer et al. ...... 414/789.1 |
| 4,036,362 A * | 7/1977 | Ullman .......................... 206/432 |
| 4,941,374 A | 7/1990 | Focke | |
| 4,988,263 A * | 1/1991 | Odenthal ................... 414/795.8 |
| 5,336,042 A * | 8/1994 | Winski et al. ............... 414/789.5 |
| 5,375,493 A | 12/1994 | Focke et al. | |
| 5,443,357 A * | 8/1995 | Leeds et al. ................. 414/792.9 |
| 5,445,053 A * | 8/1995 | Kallner ............................. 83/23 |
| 5,522,692 A * | 6/1996 | Simkowski ................. 414/789.5 |
| 5,664,767 A * | 9/1997 | Voss ............................... 271/218 |
| 6,431,817 B1 * | 8/2002 | Simkowski ................. 414/796.9 |
| 6,601,489 B2 * | 8/2003 | Reinders ........................... 83/23 |
| 6,658,816 B1 * | 12/2003 | Parker et al. .................... 53/397 |
| 7,216,470 B2 * | 5/2007 | Nishida ........................... 53/520 |
| 7,387,818 B2 | 6/2008 | Hedegaard | |
| 2006/0048479 A1 * | 3/2006 | Hedegaard ....................... 53/157 |

FOREIGN PATENT DOCUMENTS

| | | |
|---|---|---|
| CA | 2500638 | 4/2004 |
| DE | 3409964 | 9/1985 |
| DE | 3627577 | 2/1988 |
| DE | 4207808 | 9/1993 |
| DE | 19732243 | 2/1999 |
| DE | 20120699 | 4/2003 |
| DE | 60310984 | 10/2007 |
| WO | WO 03/053826 | 7/2003 |

* cited by examiner

*Primary Examiner* — Thanh K Truong
(74) *Attorney, Agent, or Firm* — Simpson & Simpson, PLLC (57) ABSTRACT

A method for palletizing confectioned units including the steps of grouping the confectioned units to a layer of confectioned units in a grouping device, providing a material for an intermediate layer comprising a partly elastic foil material, cutting a single sheet from the material for the intermediate layer, moving the layer of confectioned units and the single sheet of the intermediate layer to a transport device, moving the layer of confectioned goods and the single sheet of the intermediate layer into the loading station of the transport device, transporting the layer of confectioned goods and the single sheet of the intermediate layer to an unloading station, and positioning the layer of confectioned goods and the single sheet of the intermediate layer at the unloading station onto a pallet or onto layers of goods which are already positioned on the pallet.

6 Claims, 6 Drawing Sheets

METHOD AND APPARATUS FOR PALLETIZING CONFECTIONED UNITS OF ARTICLES

CROSS REFERENCE TO RELATED APPLICATIONS

This patent application claims priority of German Patent Application No. DE 10 2008 020 301.7, filed on Apr. 22, 2008, which application is incorporated herein by reference in its entirety.

FIELD OF THE INVENTION

The present invention relates to a method for palletizing confectioned units of at least two articles. In addition, the present invention relates to an apparatus for palletizing confectioned units with at least two articles.

BACKGROUND OF THE INVENTION

Palletizers for the production of confectioned units of articles on pallets are known from the prior art. An empty pallet, frequently a wooden pallet, a plastic pallet or a euro pallet, is provided in a loading station. On this pallet, the packaged goods, particularly confectioned goods in the form of bottle cases, disposable confectioned units or the like, are arranged.

When arranging the confectioned units of liquid containers which are configured by a shrink foil, single sheets of intermediate layers are positioned in general between two consecutive layers of confectioned units in order to stabilize the loaded pallets. A firm carton layer or cardboard layer is frequently used as a single sheet of an intermediate layer.

The confectioned units are lifted during palletization from a station providing confectioned units onto the pallet. A single sheet of an intermediate layer consisting of paper or carton is afterwards placed onto the layer of confectioned units, and a second layer of confectioned units is positioned onto said single sheet of intermediate layer by the station providing confectioned units.

U.S. Pat. No. 4,941,374 describes an apparatus for the loading of pallets with cartons which are arranged in layers, wherein single sheets of intermediate layers consisting of paper are used. The single sheet of intermediate layer is placed onto the carton layer by means of a rotatable cantilever arm having a suction holder. The paper is provided on a roll and cut to the correct size.

Canadian Patent Application CA 2500638 shows a palletizer which provides single sheets of intermediate layers from a roll, wherein the single sheets of intermediate layers are consecutively dispensed and coated with non-skid material during dispension.

German Utility Model DE 201 20 699 U1 describes the palletization of packaged goods by means of a palletizer consisting of three palletizing units, wherein the single sheets of intermediate layers are taken from a stockpile.

German Patent Application DE 36 27 577 A1 describes a palletizing station, wherein single sheets of intermediate layers, which consist of paper for example, are placed between individual product layers to secure them against tipping. The packaged goods are arranged onto the pallet by means of a lifting device and a product layer feed with a moveable sliding bottom. A paper storage is located beneath the sliding bottom, wherein said paper storage removes the single sheets of intermediate layers consisting of paper from a paper magazine.

BRIEF SUMMARY OF THE INVENTION

The object of the invention is to create a method for an easy and quick palletization of confectioned units of articles with single sheets of intermediate layers. The term "articles" means all articles which are able for palletization such as packages, cartons, cans or the like, and is not limited with regard to liquid containers and confectioned units made of liquid containers.

The above object is achieved by a method for palletizing confectioned units with at least two articles comprising the steps of: grouping the confectioned units to a layer of confectioned units in a grouping device; providing a material for an intermediate layer, which is a partly elastic foil material on at least one roll; cutting a single sheet from the material for the intermediate layer prior to or during provision of the single sheet of the intermediate layer to a loading station; moving the layer of confectioned units and the single sheet of the intermediate layer to a transport device; moving the layer of confectioned goods and the single sheet of the intermediate layer into the loading station of the transport device; transporting the layer of confectioned goods and the single sheet of the intermediate layer to an unloading station; and, positioning the layer of confectioned goods and the single sheet of the intermediate layer at the unloading station onto a pallet or onto layers of goods which are already positioned on the pallet.

Another object of the invention is to create an apparatus which easily provides single sheets of intermediate layers used during palletization and adjusts said single sheets of intermediate layers accordingly.

The above object is achieved by an apparatus for palletizing confectioned units with at least two articles comprises: at least one roll, wherein the roll carries a material for an intermediate layer, which is a partly elastic foil material; a cutting unit which provides a single sheet of the material for the intermediate layer which is positioned between two consecutive layers of confectioned units; a grouping device for grouping the confectioned units to a layer; a unit for providing the layers of confectioned units; a unit for providing the single sheet of the intermediate layer; and at least one transport device for moving the layer of confectioned units and the single sheet of material for the intermediate layer.

With the described method for palletizing confectioned units of articles, the confectioned units are firstly grouped in a grouping device. Thereby, the required layer of confectioned units is produced in the form in which said layer of confectioned units should be positioned afterwards onto the pallet.

The prepared layer of confectioned units and a single sheet of the intermediate layer are moved to a transport device which carries said layer of confectioned units and said single sheet of the intermediate layer at a loading station. The station providing confectioned units or the transport device operates, for example, with a rotatable column and one or two height adjustable loading stations. These can be constructed as suction grippers, clamping grippers or the like. Preferably, the loading station is a shutter gripper head with suction cups for handling the single sheet of an intermediate layer, wherein said suction cups are arranged underneath.

The grouped layer of confectioned units is moved into the shutter gripper head while the single sheet of the intermediate layer is sucked on the underside of the shutter gripper head by the suction cups.

Afterwards, the layer of confectioned units and the single sheet of the intermediate layer are together transported to an unloading station. This happens, for example, by rotating the shutter gripper head about an axis, so that the loading station is positioned above the empty or possibly already partially loaded pallet. By positioning the single sheet of the intermediate layer and opening the shutter gripper head, by what the layer of confectioned units is positioned, the single sheet of the intermediate layer and the layer of confectioned units are positioned onto the pallet.

According to the present invention, the single sheet of the intermediate layer consists of a partly elastic foil material which is provided on at least one roll. The cutting of the single sheet of the intermediate layer from the roll is hereby carried out prior to or during the feed of the single sheet of the intermediate layer to the loading station of the transport device.

The advantage of the common transport of the single sheet of the intermediate layer and the layer of confectioned units is that the single sheet of the intermediate layer can be extremely thin so that the common transport enables the usage of a thin foil for intermediate layers.

According to a preferred embodiment, the described method for palletizing confectioned units consisting of a plurality of liquid containers, which are configured by a shrink foil to confectioned units, is used.

The cutting of the single sheet of the intermediate layer, which is provided on the roll, is carried out by a cutting unit. Thereby, the cutting unit can be provided with a knife, a laser or another suitable cutting appliance known to a person skilled in the art.

According to another embodiment, the single sheets of intermediate layers on the roll can already be predetermined by perforation. That is that the cutting is effected by separating the perforation. This can be carried out, for example, by a perforation knife.

The invention relates furthermore to an apparatus for palletizing confectioned units of liquid containers.

The apparatus is provided with a cutting unit for the single sheets of intermediate layers. Thereby, said cutting unit can be constructed like the above-mentioned cutting device or like an apparatus for separating perforations.

Furthermore, the apparatus is provided with a grouping device, by means of which the confectioned layers are configured to layers of confectioned units accordingly and provided by a feeding unit to the transport device. According to a preferred embodiment, the transport device is provided with a rotatable column and with at least one loading station, wherein the loading station is loaded with the layer of confectioned units and the single sheet of the intermediate layer which are simultaneously transported to the pallet and positioned thereon.

The apparatus keeps furthermore at least one roll with intermediate layer material as a reservoir roll, wherein the single sheets of the intermediate layers are of a partly elastic foil material and have to be cut from the roll on certain perforation lines by cutting or separating.

According to a preferred embodiment, the loading station is a shutter gripper head with suction cups, which are arranged underneath, for handling the single sheet of the intermediate layer. The bottom of this loading station is constructed shutter-like, that is in particular that the bottom consists of a plurality of movable rolls which can be moved laterally upwards so that the confectioned units which are arranged on said bottom with movable rolls can be positioned onto the pallet.

Furthermore, fixing elements are arranged underneath the bottom for the single sheet of the intermediate layer. Said fixing elements can be suction cups, for example, which adhere to the single sheet of the intermediate layer by means of vacuum. Any other fixation of the single sheet of the intermediate layer known to the person skilled in the art should hereby also be comprised.

The at least one loading station is preferably positioned at a rotatable column, so that the grouping of the confectioned units, the provision of the confectioned units and the single sheet of the intermediate layer to the loading station, and the loading with the confectioned units and the single sheet of the intermediate layer can be carried out on one side of the apparatus. The provision of the possibly already partially loaded pallet by means of a suitable transport device, a pallet conveyor belt for example, can be carried out then on another side, for example 90° or 180° shifted to the grouping of the confection unit. On this position, also the unloading of the single sheet of the intermediate layer and the layer of confectioned units is carried out.

The loading station is preferably arranged height adjustably at a rotatable column. Thereby, an adjustment to the given pallet height can be effected. If the pallet is not yet loaded, the loading station must be adjusted lower prior to the positioning of the single sheet of the intermediate layer and the layer of confectioned units, so that said single sheet of the intermediate layer and said layer of confectioned units do not fall onto the pallet but are positioned in the correct height. If the pallet is already loaded with one or more layers of confectioned units, the loading station must be adjusted higher, of course, so that the single sheet of the intermediate layer and the layer of confectioned units can be positioned properly.

BRIEF DESCRIPTION OF THE DRAWINGS

Exemplary embodiments of the method according to the present invention and the apparatus according to the present invention and their advantages will be explained in more detail with reference to the accompanying drawings, wherein.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it should be understood that this invention is not limited to the particular methodology, materials and modifications described and as such may, of course, vary. It should also be understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

A possible apparatus 10 for palletizing packaged goods, particularly layers of confectioned units 26, is illustrated in FIGS. 1-5.

Figure 6A:
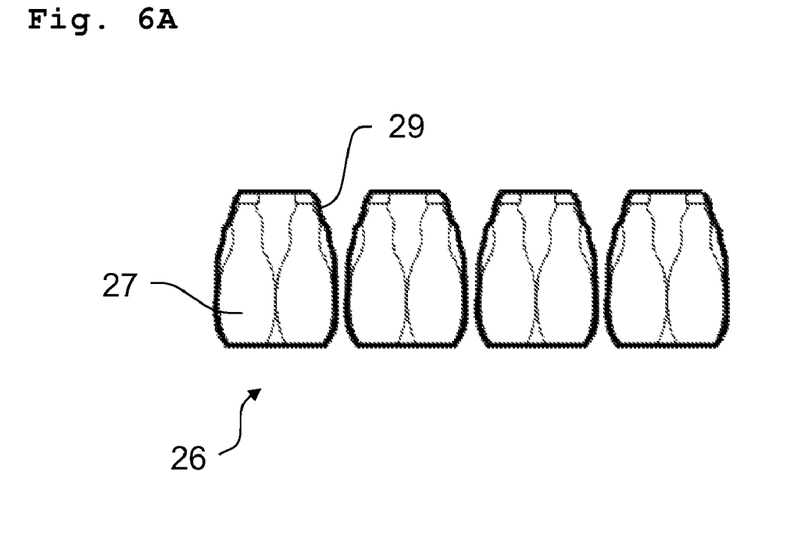
Figure 6B:
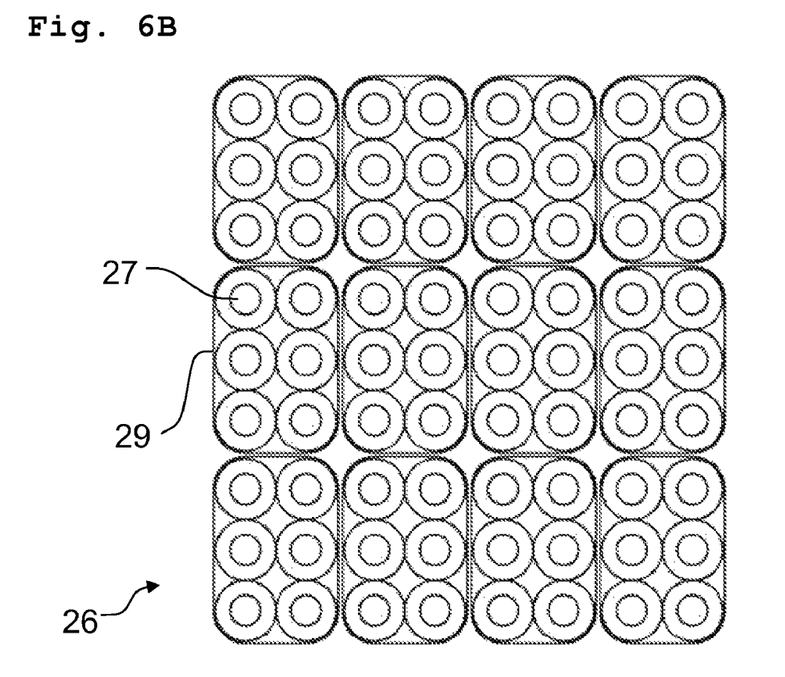

The apparatus comprises a grouping device and a grouping station 20 respectively, in which the packaged goods, which are to be palletized, are grouped in desired rows or layers 26. The grouped packaged goods, for example confectioned units of bottles 27 as shown in FIGS. 6A and 6B, or the like, which bottles are configured into the confectioned units by shrink foil 29, are afterwards moved by a feeding unit 22 to the transport device 30 by means of a slider 24 for example. The transport device 30 is responsible for transporting the layer of confectioned units 26 to the pallet and for positioning said layer of confectioned units onto the pallet.

According to the shown embodiment, the transport device 30 comprises a rotatable column 32. In the embodiment, two arms 34 each with one loading station 36 are arranged at this rotatable column 32. The loading stations 36 are preferably apparatuses with one shutter gripper head known to a person skilled in the art from DE 29 45 883 and DE 34 09 964.

The loading stations 36 are provided with at least one lateral opening 37, through which the layers of confectioned units can be slided-in. In addition, the loading stations 36 are provided with fixing elements for fixing or holding a single sheet of the intermediate layer 60 temporarily. The fixing element can be a controllable suction cup, for example, which can be charged with vacuum, for instance, and thereby holding the single sheet of the intermediate layer. Furthermore, the usage of a clamping device as a fixation element is possible. Further alternatives for fixing a single sheet of an intermediate layer which are known to the person skilled in the art should also be comprised by the present application.

The palletizing unit 10 is furthermore provided with a device for the feeding of single sheets of intermediate layers 50. Said device consists of at least one roll 52, onto which the single sheets of intermediate layers are wound up in the form of a continuous length of material. In the embodiment shown in FIGS. 1-4, two intermediate layer rolls 52, 53 are provided. The second roll 53 hereby serves as a reservoir roll. If the first roll 52 is empty, new single sheets of intermediate layers are directly taken from the second roll 53.

The single sheets of intermediate layers are cut into relevant sizes by a cutting unit 54. Thereby, the cutting unit 54 can be provided both with a cutting knife and a laser cutting device or the like. The cutting unit is preferably controlled mechanically or electronically.

According to an alternative embodiment, the sizes of the single sheets of intermediate layers on the roll 52, 53 can already be predetermined by perforation, so that the single sheets of intermediate layers only need to be separated on the perforation line by a perforation knife, for example. The single sheets of intermediate layers are transported by a transport device 56 underneath the loading station 36 and fixed underneath of the loading station 36 by the fixing element described above. Furthermore, the loading station 36 is loaded by the feeding unit 22, 24 with the packaged goods simultaneously or prior or after fixation of the single sheet of the intermediate layer in such a way that the layer of confectioned units is provided by the feeding unit 22, 24 to the loading station 36 and slided-in through the lateral opening 37.

After the loading station 36 has received the layer of confectioned units and the single sheet of the intermediate layer, said loading station 36 is moved to the conveyor belt 40 by rotating the rotatable column 32. The layer of confectioned units and the single sheet of the intermediate layer are together transported accordingly to the pallet, which significantly saves costs and time. The pallet conveyor belt 40 provides the empty or partially loaded pallet, onto which the new single sheet of the intermediate layer and the layer of confectioned units are together positioned after coming from the loading station 36.

The positioning of the single sheet of the intermediate layer is carried out by removing the single sheet of the intermediate layer from the fixing element which is assigned to the loading station 36. If the fixing element is a suction cup which is charged with vacuum, for example, then the single sheet of the intermediate layer is positioned onto the possibly already partially loaded pallet by discharging the vacuum. The positioning of the confectioned units is carried out depending on the type of loading station 36 used. If the loading station 36 is a shutter gripper head according to DE 9202553 U1, then the lower supporting level 38, which is shutter-like, is retracted, so that the underside of the loading station 36 is open and the layer of confectioned units is positioned onto the pallet above the likewise positioned single sheet of the intermediate layer.

Figure 1:
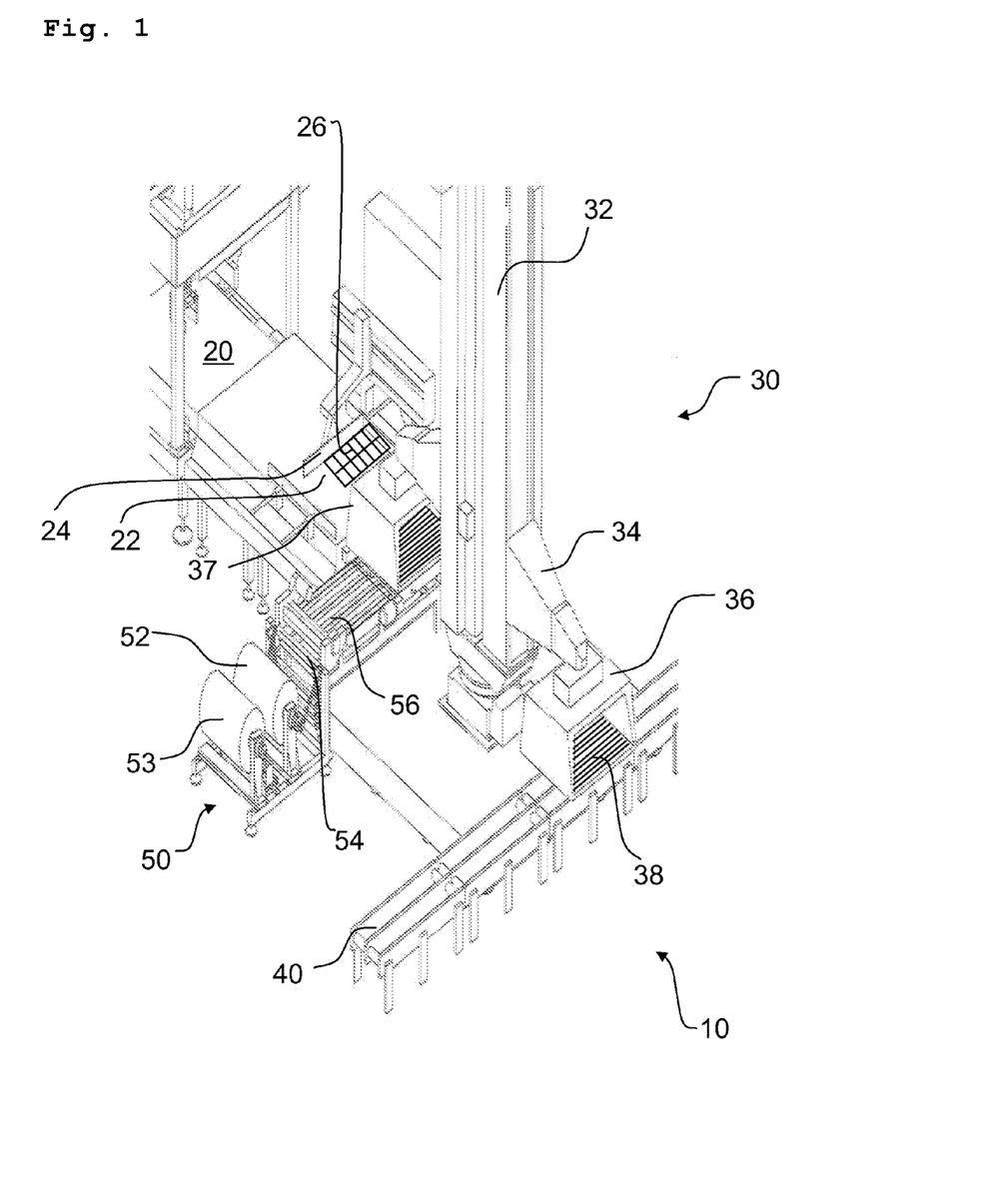
FIGS. 1-4 show various views of a palletizing unit with one feeding unit for single sheets of intermediate layers from two rolls.
Figure 2:
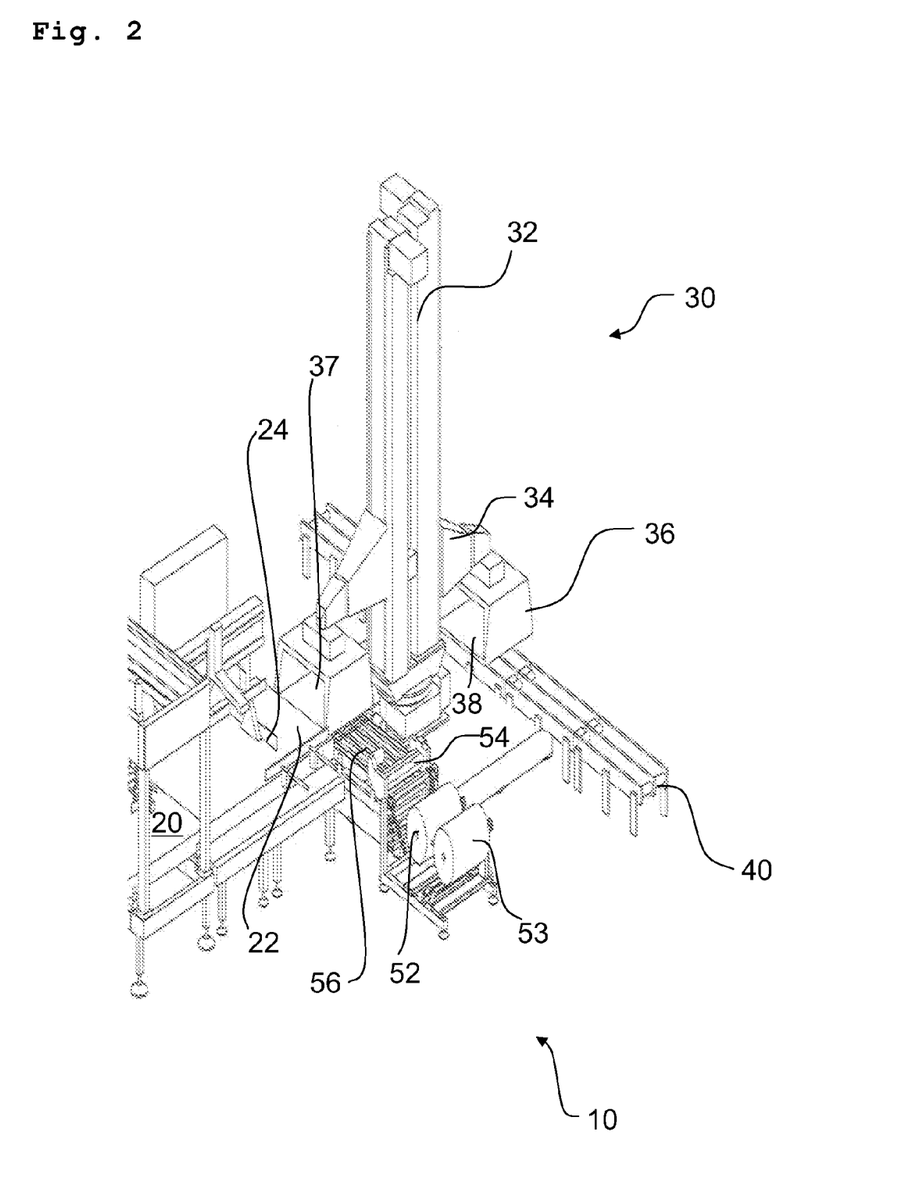
Figure 3:
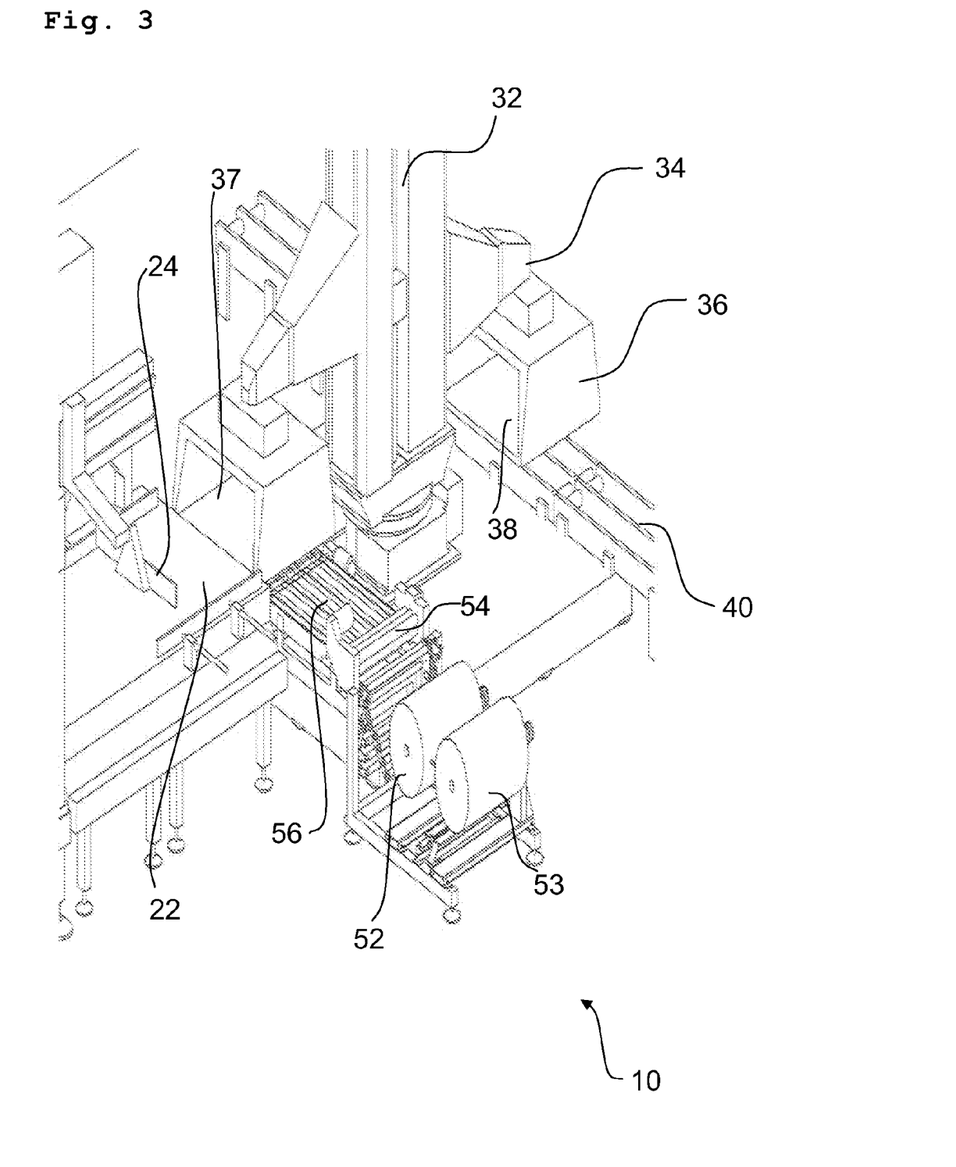
Figure 4:
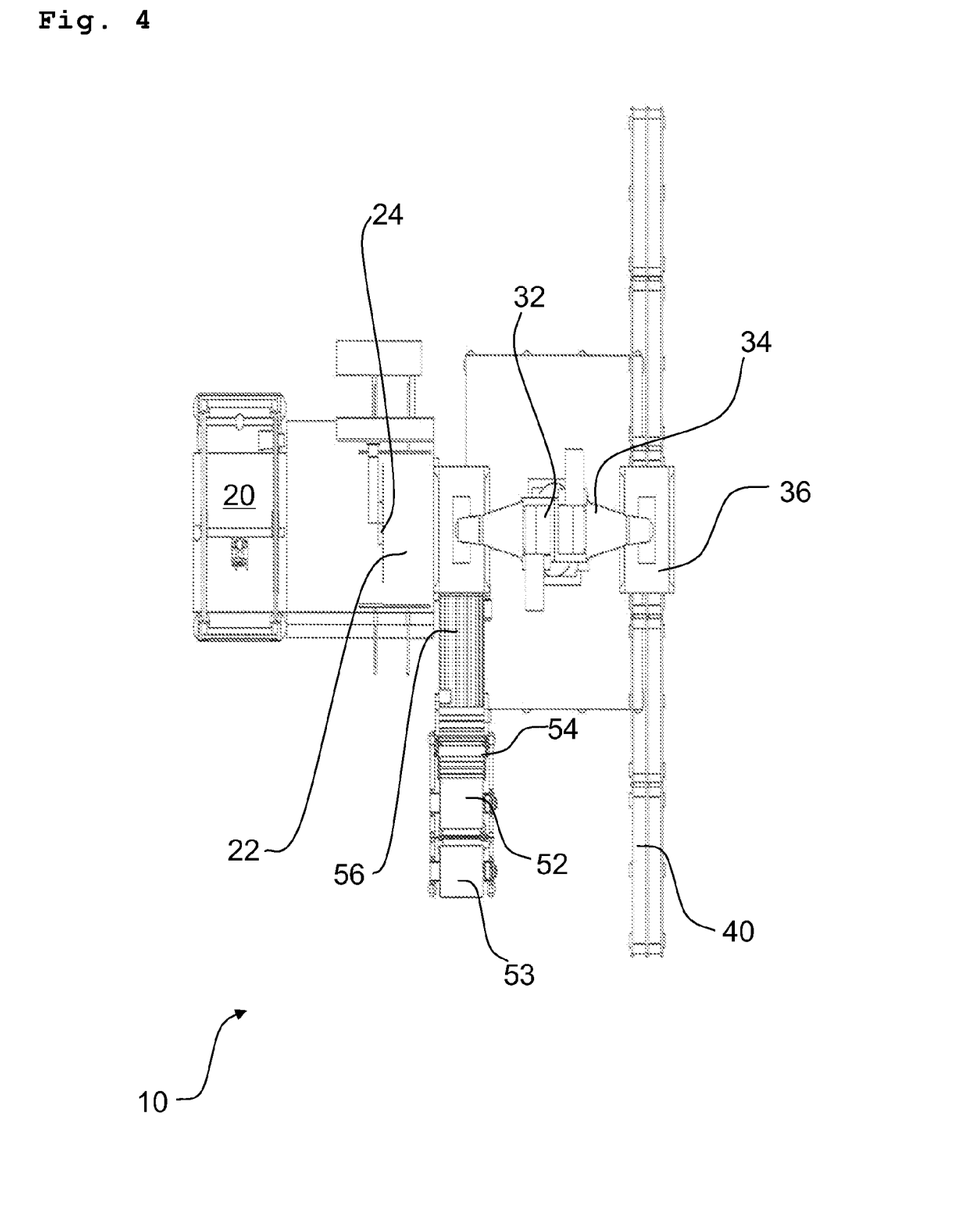
Figure 5:
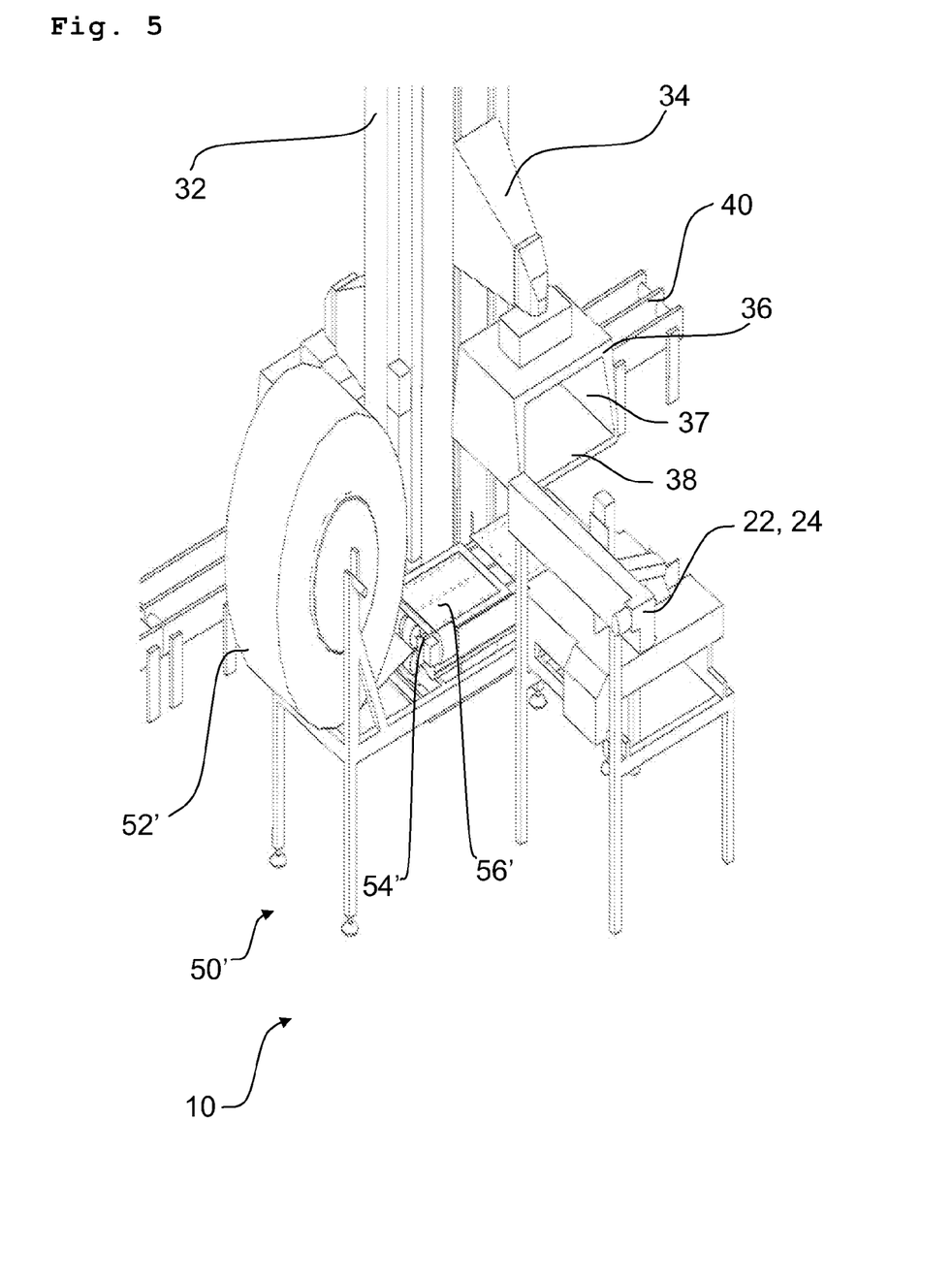
FIG. 5 shows a palletizing unit with one feeding unit for single sheets of intermediate layers from one roll on the input side; and, FIGS. 6A and 6B show respective side and top views of layers of confectioned units of bottles configured by shrink foil.

FIG. 5 shows an alternative embodiment using only one intermediate layer roll 52'. In this embodiment, the entire apparatus for the feed of intermediate layers 50' is arranged on the opposing side in relation to the station providing confectioned units 22, 24. The apparatus for the feeding of intermediate layers 50' is also provided with a cutting unit 54' and a transport device 56'. The cut single sheets of intermediate layers are transported to or underneath the loading station 36 by the transport device 56' and received by said loading station 36 by the fixing elements described above.

The reception of the confectioned units as well as the transport and the positioning of the single sheet of the intermediate layer and the confectioned unit onto the possibly already partially loaded pallet are carried out according to the description to the FIGS. 1-4.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What is claimed is:

1. An apparatus for palletizing confectioned units with at least two articles, the apparatus comprising:
   at least one roll, wherein the at least one roll carries a material for an intermediate layer comprising a partly elastic foil material;
   a cutting unit arranged to provide a single sheet of the material for the intermediate layer which is positioned between two consecutive layers of confectioned units;
   a grouping device for grouping the confectioned units to a layer;
   a unit for providing the layers of confectioned units;
   a unit for providing the single sheet of the intermediate layer; and,
   at least one transport device for moving the layer of confectioned units and the single sheet of material for the intermediate layer;
   wherein the at least one transport device comprises a loading station for receiving the layers of confectioned units, the loading station having a bottom, wherein the bottom of the loading station is provided with fixing elements for receiving the single sheet of the intermediate layer, wherein the intermediate layer is fixed underneath the bottom of the loading station by the fixing elements and wherein the layer of confectioned units and the intermediate layer are transported together by the at least one transport device.

2. The apparatus recited in claim 1, wherein the confectioned units comprise a plurality of liquid containers configured to confectioned units by a shrink foil.

3. The apparatus recited in claim 1, wherein the bottom of the loading station is designed shutter-like.

4. The apparatus recited in claim 1, wherein the at least one transport device is provided with a rotatable column.

5. The apparatus recited in claim 4, wherein the loading station is arranged height adjustably at the rotatable column.

6. The apparatus recited in claim 1, further comprising a conveyor belt for pallets.

* * * * *